UNITED STATES PATENT OFFICE.

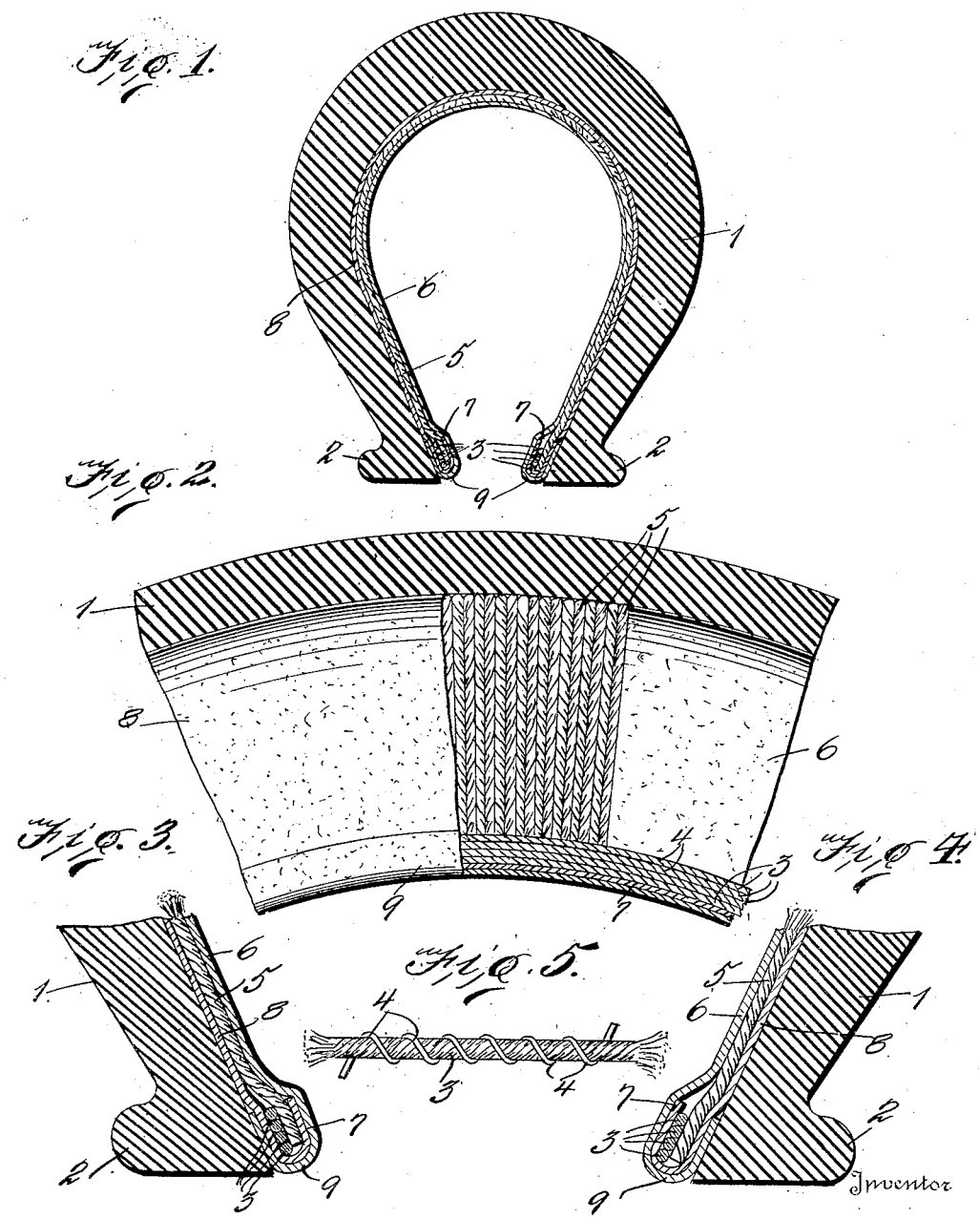

CHARLES L. ARCHER, OF COUNCIL BLUFFS, IOWA.

INNER CASING FOR AUTOMOBILE-TIRES.

1,186,160.  Specification of Letters Patent.  Patented June 6, 1916.

Application filed May 10, 1915. Serial No. 27,173.

*To all whom it may concern:*

Be it known that I, CHARLES L. ARCHER, a citizen of the United States of America, residing at Council Bluffs, in the county of Pottawattamie and State of Iowa, have invented certain new and useful Improvements in Inner Casings for Automobile-Tires, of which the following is a specification, reference being had therein to the accompanying drawing.

This invention relates to an inner casing for automobile tires and has for its principal object the production of an inner lining which may be conveniently used on the inside of a pneumatic tire for prolonging the life thereof and protecting the inner tube, which is used in connection therewith, such inner lining being made of a combination of rubberized cords and fabric united together by vulcanizing so as to form a complete circle which will fit within different sized outer casings.

Another object of this invention is the production of an inner lining which is composed of a plurality of rubberized cords, having wire reinforcements, thereby reinforcing the base of the lining, while transverse rubberized cords are interposed between the layers of the fabric, all of which are to be united so as to form a one-piece structure.

With these and other objects in view, this invention consists of certain novel combinations, constructions, and arrangements of parts as will be hereinafter fully described and claimed.

In the accompanying drawings:—Figure 1 is a transverse section through a pneumatic tire, showing the lining carried thereby as constructed in accordance with this invention. Fig. 2 is a longitudinal section of a portion of a pneumatic tire, showing the inner lining carried thereby partly broken away. Fig. 3 is a fragmentary sectional view through a portion of the pneumatic tire illustrating the base of the lining. Fig. 4 is a view similar to Fig. 3, illustrating the opposite side of a portion of the tire and the inner casing shown in Fig. 3. Fig. 5 is a plan view of a portion of one of the longitudinal base cords, illustrating the manner in which the same is reinforced.

Referring to the accompanying drawing by numerals 1 designates the outer casing of a pneumatic tire which is provided with the usual heels 2 which will facilitate the securing of the tire to the rim of a wheel. The lining used in connection with this pneumatic tire 1 is adapted to be carried therein so as to protect the inner tube and at the same time prolong the life of the tire 1, inasmuch as when the tire 1 becomes worn or cut, the lining will still constitute a shield for the inner tube, and therefore will allow the outer casing or tire 1 to be used longer than it would otherwise.

The lining comprises a plurality of base cords 3 which are positioned side by side and extend in longitudinal directions so as to form hoop-like structures adjacent each heel 2 of the tire 1. These cords 3 are reinforced by being wound with small wires 4, such for instance as piano wires, and since the cords 3 are also rubberized, they will form very strong and substantial bases adjacent each heel. The transverse cords 5 are also rubberized and extend in transverse relation to the central axis of the tire casing 1 and have their end portions engaging the hoops formed by the longitudinal cords 3 upon each side of the tire 1. These cords 5 are rubberized and will be greatly reinforced and will extend in transverse relation to the casing 1 so as to form a positive reinforcement therefor.

The outer fabric sheet 8 is passed around the outer portions of the transverse cords 5 and has its outer side edges lapped around the ends of the transverse cords 5 so as to terminate adjacent the bases of the hoops formed by the longitudinal base cords 3, as shown at 7. The inner fabric lining 6 is passed around the inner portions of the transverse cords 5 and has its outer side edges lapped over the folded or lapped portion 7 of the outer fabric sheet 6, as shown at 9, so as to bear against the inner portions of the pneumatic casing 1.

After the device has been assembled, as above set forth, it is vulcanized so as to form a one-piece structure which is capable of being placed within the inner portions of any pneumatic tire for forming a reinforcing lining therefor, for the purpose of protecting the inner tube when the device is in operation. By having the device vulcanized it will be seen that the transverse cords will be positively retained in engagement with each other, this action also being facilitated by means of the inner and outer fabric sheets 6 and 8, as hereinbefore set forth. It will of course be seen that by having the ends 7 and 9 of the fabric sheets 6 and 8 lapped as hereinbefore set forth, the sheets will be positively retained in position, independently of the vulcanizing process while by having the ends terminating adjacent the hooks formed by the longitudinal cords 3, sufficient space is provided for this folding or lapping action.

From the foregoing description, it will be seen that a very simple and efficient inner lining has been produced for pneumatic tires wherein the several elements are so positioned as to be readily assembled but which are adapted to be positively retained in engagement with each other for forming a substantially one-piece structure.

What I claim is:—

In a lining for pneumatic tires, the combination of a plurality of transversely extending cords positioned side by side, a plurality of longitudinally extending cords positioned side by side to form hoop-like structures, the end portions of said transversely extending cords engaging said hoop-like structures, an outer fabric sheet fitting upon the outer portions of said transversely extending cords, the portions of said sheet adjacent the side edges thereof being bent so as to fit over the ends of said transversely extending cords and over said hoop-like structures, and an inner lining fitting upon the inner portions of said transversely extending cords, the portions of said inner lining adjacent the side edges thereof being bent so as to overlap and fit upon the bent-over portions of said outer fabric sheet, said cords, sheets, and lining being adapted to be vulcanized together, the overlapped portions of said inner lining being adapted to engage the inner portions of a pneumatic tire, thereby preventing its becoming torn from engagement with said outer fabric sheet.

In testimony whereof I hereunto affix my signature in presence of two witnesses.

CHARLES L. ARCHER.

Witnesses:
  Geo. S. Wright,
  Rally Ehle.